INVENTORS
Russell D. Gould
John E. Richter
Attorneys

United States Patent Office 3,457,712
Patented July 29, 1969

3,457,712
TREE SHAKING APPARATUS
Russell Dunplop Gould, 12750 N. Capitol Ave., San Jose, Calif. 95133, and John Edward Richter, 2048 McDaniel Ave., Santa Clara, Calif.
Filed Jan. 6, 1966, Ser. No. 519,177
Int. Cl. A01g *19/08*
U.S. Cl. 56—328                    8 Claims

ABSTRACT OF THE DISCLOSURE

An improved shaking mechanism for use in mechanical tree harvesting apparatus to achieve simultaneous reciprocatory and gyratory shaking forces through use of timed, oppositely rotating weights. The oppositely rotating weights cooperate with a hooking mechanism carried by an elevatable boom (and particularly an articulated portion thereof) to achieve a simultaneous reciprocatory vibration of the hooking means along a line substantially parallel to a line through the axes of the rotating weights, and a gyratory or oscillatory vibration about a center gyration substantially midway between the rotating weights. The desired effect is achieved with minimal bark damage by mounting the oppositely rotating weights so that their axes of rotation are on a line substantially parallel to the direction of shaking established by the boom (or the articulated portion thereof) and its associated hooking mechanism. While the shaking is substantially straight line, the gyratory "twist" at each to and fro shaking position acts to positively increase shaking yields.

---

This invention relates generally to tree shaking machines, and more particularly to machines of this type capable of carrying out nut and fruit harvesting operations on a large scale.

Tree shaking machines having an elevatable boom provided with tree or limb engaging members have been successfully employed in nut and fruit harvesting operations for many years. Such machines make possible the rapid and efficient harvesting of large acreages of fruit and nut crops, and permit the avoidance of problems so often encountered with respect to labor availability at the peak of harvesting seasons.

In general, it is an object of the present invention to improve on devices of the type described, particularly with respect to means providing a more efficient, rapid and thorough shaking and harvesting operation.

It is another object of the invention to provide apparatus of the above type which achieves a more effective shaking of an engaged tree member through simultaneous application of recipractory and gyratory shaking forces.

A further object of the invention is to provide apparatus of such character which applies the shaking forces from an offset position to achieve a supplemental twisting or oscillatory shaking effect.

A further object of the invention is to provide apparatus which is specifically adapted to harvesting the crop of an entire tree through application of all the shaking forces to the trunk of the tree.

Additional objects and advantages of the invention will appear from the following description in which preferred embodiments have been set forth in conjunction with the accompanying drawings.

Referring to the drawings:

FIGURES 10A, B, and C are a series of diagrammatic representations, in sequence, illustrating the reciprocatory any gyratory forces generated by the illustrated shaking mechanism.

Generally stated, the present invention relates to improvements in tree shaking mechanisms wherein the shaking mechanism is effective to impart simultaneous reciprocatory and gyratory shaking forces to an engaged tree member. More specifically, the shaking mechanism makes use of oppositely rotating weights and means timing the rotation of such weights to achieve a simultaneous reciprocatory vibration of the shaking means along a line through the axes of the rotating weights and a gyratory or oscillatory vibration of the shaking means about a center of gyration substantially midway between the rotating weights. These simultaneous vibratory forces have been found to generate a resultant shaking effect which combines to-and-fro shaking with a reversible twisting of the engaged tree member. The described shaking effect has been further found to provide substantially improved shaking efficiencies, as demonstrated by larger crop yields from previously "shaken" orchards.

The tree shaking machines of the present invention are particularly adapted to use as trunk shakers wherein the machine employs a hooking mechanism sufficiently large to grasp the trunk of a tree and the entire tree shaken in one operation to harvest its crop. In a preferred embodiment, the tree engaging hooking mechanism is offset from the center line of the vibratory shaking mechanism to achieve a supplemental twisting or oscillatory shaking effect which further enhances shaking efficiencies.

Figure 12:
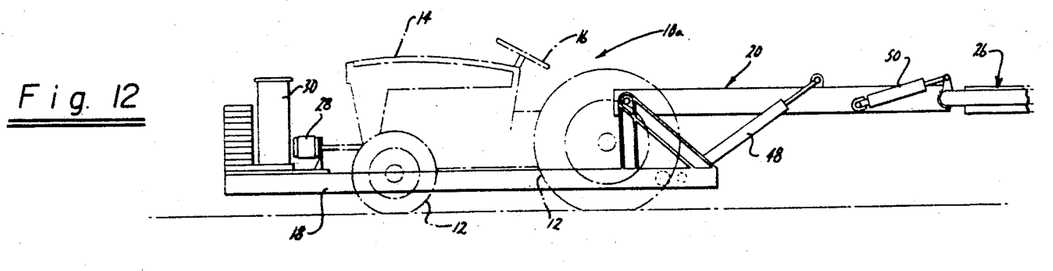
FIGURE 12 is a view like FIGURE 1, illustrating a further embodiment of a machine incorporating the present invention.

Each of the machines illustrated in the drawings is shown in conjunction with a self-propelled vehicle 10 having wheels 12, a motor 14 for driving at least one pair of the wheels and a steering mechanism 16. A subframe 18 is carried by the wheels 12 and provides a means to pivotally mount an elevatable boom 20 which carries a hooking mechanism 22 and associated shaking mechanism 24. The hooking and shaking mechanisms are preferably mounted on an alignment mechanism in the form of an articulated boom portion 26 pivotally attached to and supported on the free end of the boom 20. In embodiment illustrated in FIGURES 1 to 11, the boom 20 is supported at a forward position on the vehicle so as to facilitate operation from the driver's seat of the vehicle. In this embodiment, the controls for the boom hooking and shaking mechanisms are mounted in a position of easy access immediately in front of the operator, as generally represented at 28 in FIGURE 1. In the embodiment of FIGURE 12, the support frame 18 is mounted on a conventional agricultural tractor 10*a*, and projects rearwardly of the tractor to provide a rear mounting for the boom 20. In this embodiment the controls can be mounted alongside or immediately behind the operator.

Figure 11:
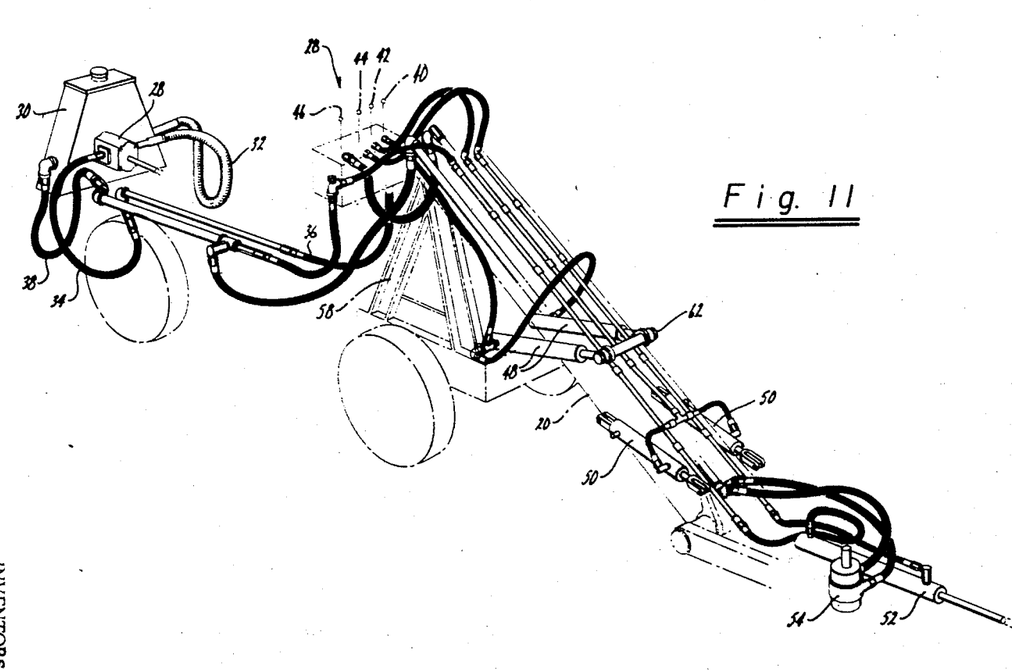
FIGURE 11 is a schematic view in perspective illustrating various operating mechanisms associated with the machine, including the hydraulic system.

In the illustrated embodiments of the machine, the mechanism for elevating the boom and for aligning, operating and shaking the hooking mechanism all derive power from a hydraulic pump 28 mounted on the frame and operated by the drive shaft of the propulsion vehicle 10. As illustrated in FIGURE 11, the intake side of the pump is in communication with a suitable reservoir 30 of hydraulic fluid through a conduit 32. The discharge of the pump is carried by the conduits 34 and 36 to the control unit or box at 28. From the controls, hydraulic fluid is returned to the reservoir through the main conduit 38. As will be apparent to one skilled in this art, various control valves at 28 can be operated to divert hydraulic fluid to separately operate the boom, and the alignment, hooking and shaking mechanisms, as may be necessary in the operation of the machine. Specifically, valve 40 can be operated to raise and lower the boom 20 through actuation of the hydraulic cylinders 48, the valve 42 can be operated to raise and lower the alignment mechanism 26 through actuation of the cylinders 50, the valve 44 can be operated to open and close the hooking mechanism 22 through actuation of the cylinder 52, and the valve 46 can be operated to actuate a hydraulic motor 54 for the shaking mechanism 24 (see FIGURES 1, 4 and 11).

Figure 1:
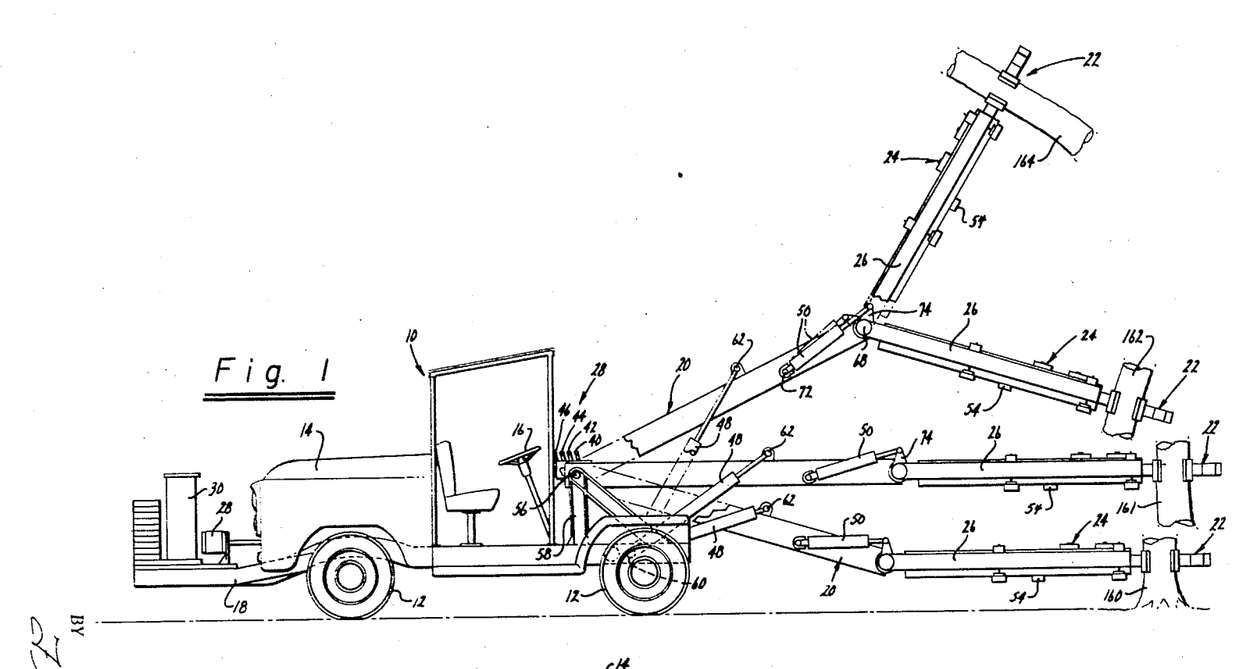
FIGURE 1 is a side elevational view with parts in phantom, illustrating various operating positions of a machine incorporating the present invention.

As best illustrated in FIGURE 1, the boom 20 is mounted for pivotal movements relative to the vehicle 10 by means of a pivot shaft 56 rotatably received within bearings carried by the upstanding framework 58. The boom 20 may be of any suitable construction such as a "stressed-skin" box frame construction stiffened by internal framework. The boom is raised and lowered between various positions of elevation, for example, as illustrated in the full and dotted line positions of FIGURE 1, by means of hydraulic cylinders 48 pivotally attached to the subframe 18 at 60 and to the boom at 62.

Figure 2:
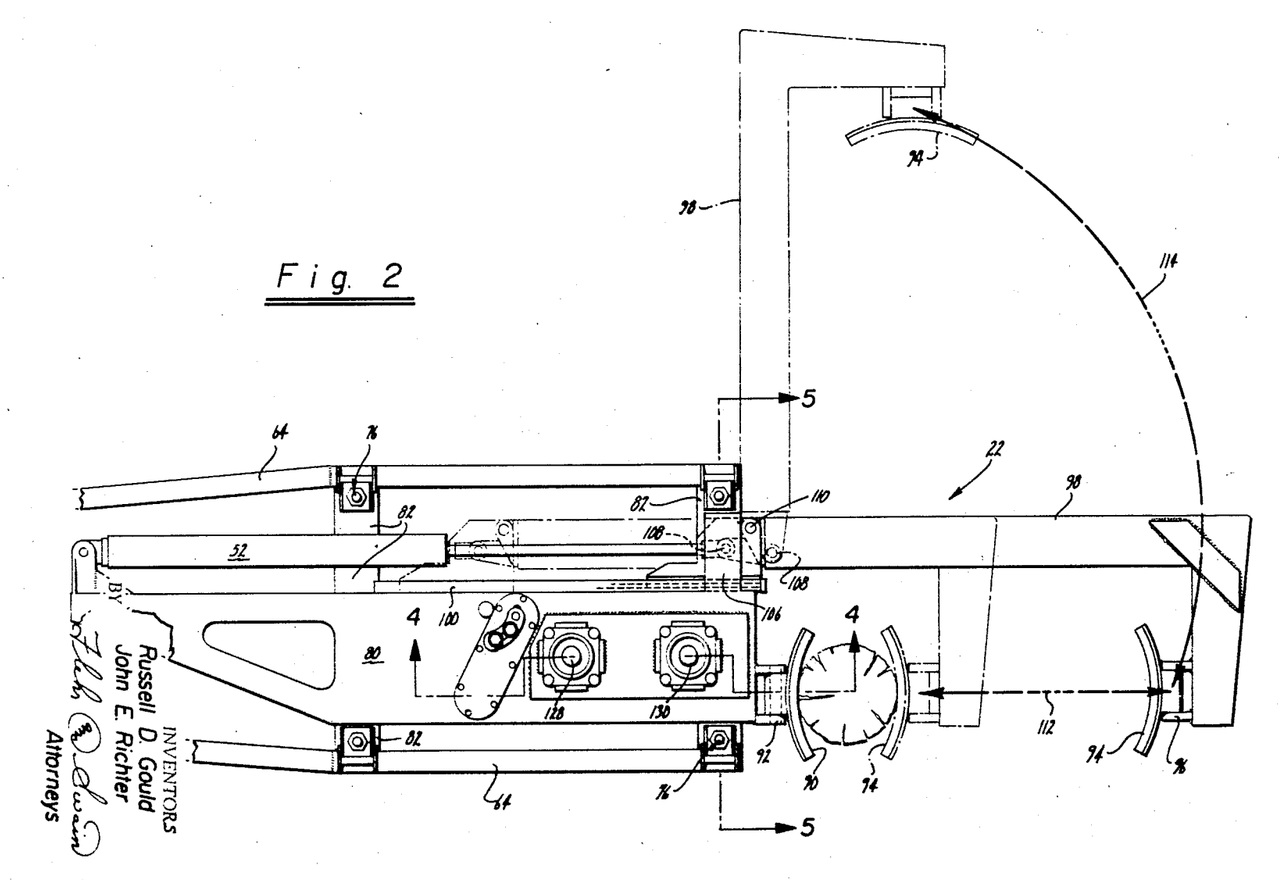
FIGURE 2 is an enlarged view in top plan of an improved hooking and shaking mechanism employed with such machine, showing various positions of the hooking mechanism.
Figure 3:
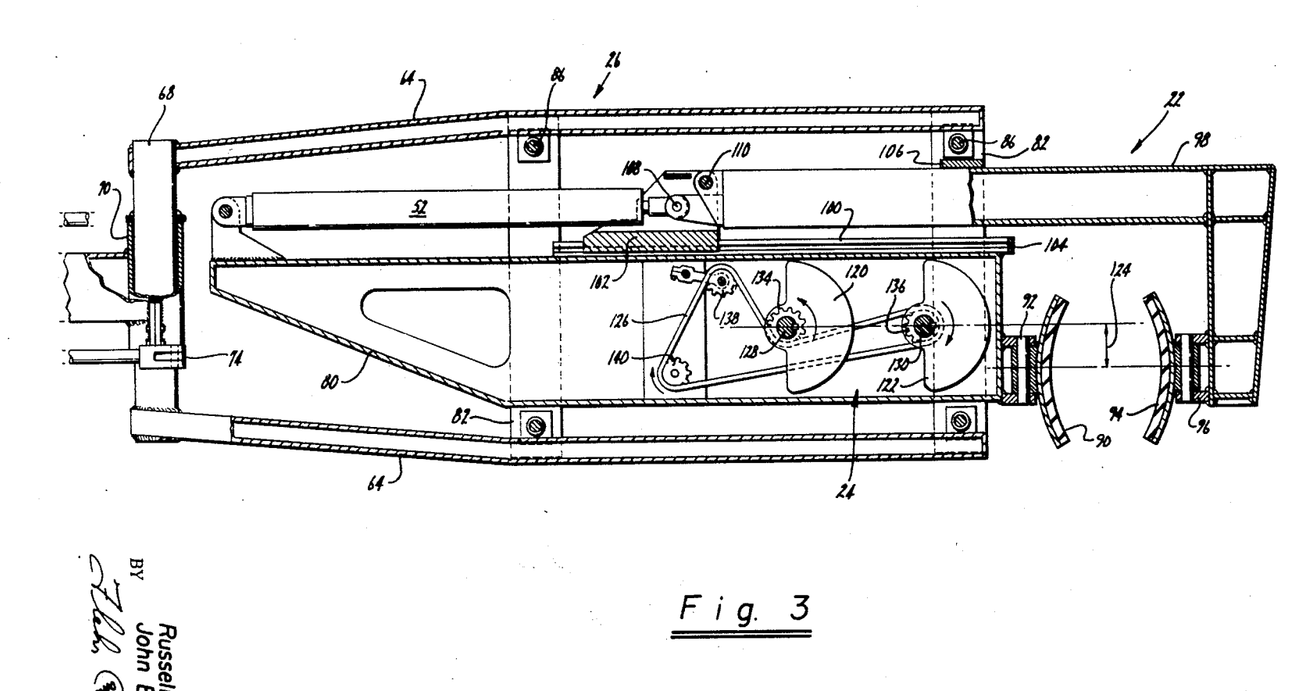
FIGURE 3 is a like view, further enlarged, with parts broken away to reveal the underlying structure.

The articulated boom portion comprising the alignment mechanism 26 is pivotally mounted on the end of the boom 20 and is preferably constructed in the form of an open framework providing spaced apart side supports 64, as shown in FIGURES 2 and 3. The alignment mechanism is mounted on the boom 20 by means of a pivot shaft 68 received in a bearing 70 carried by the outer end of the boom. Pivoting of the alignment mechanism on the boom 20 is accomplished by cylinders 50 pivotally attached at one end to the boom, as at 72. The other ends of the cylinders 50 are attached to crank levers 74 which are nonrotatably secured to the shaft 68 of the alignment frame. It will be understood that operation of the cylinders 48 and 50 (by means of the controls 40 and 42) permits the boom 20 and alignment mechanism 26 to be positioned in any desired position of vertical or horizontal alignment with respect to a tree member.

To facilitate shaking operations, the free end of the boom is equipped with a hooking and shaking assembly, comprising the mechanisms 22 and 24, by which a tree member can be quickly and easily grasped for shaking. It is a feature of the present invention that both the hooking mechanism 22 and the shaking mechanism 24 are freely suspended as a unit from the alignment mechanism 26, at the outer end of the boom 20. This mounting of the hooking and shaking mechanisms facilitates a desired application of simultaneous reciprocatory and gyratory shaking forces to an engaged tree member.

Figure 4:
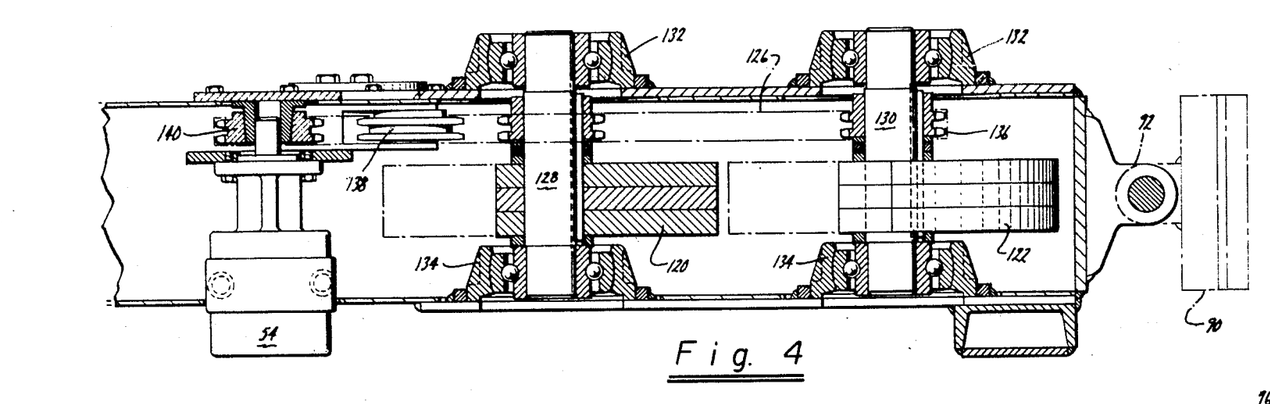
FIGURE 4 is an enlarged sectional view along the line 4—4 of FIGURE 2.
Figure 5:
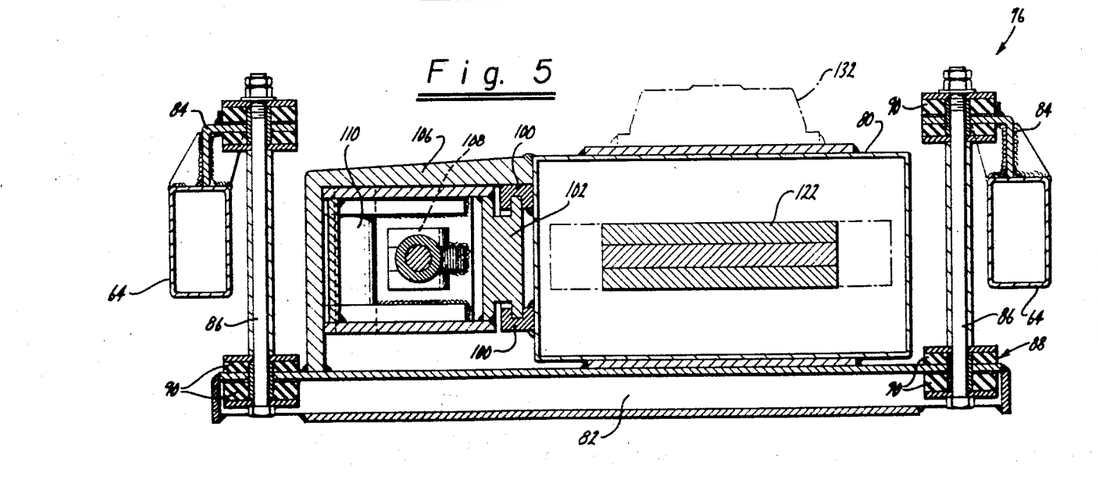
FIGURE 5 is a like view along the line 5—5 of FIGURE 2.

As illustrated in FIGURES 3 and 5, a housing 80 is provided to carry the shaking mechanism 24. The housing 80 additionally provides a convenient means to support the various components of the hooking mechanism 22, which may be securely attached to the sides and ends of the housing 80 (see FIGURES 2 through 5). The hooking and shaking mechanisms are in turn freely suspended for shaking movements by suspension units 76 carried by brackets 84 mounted on the spaced arms 64 of the alignment frame 26 (see FIGURE 5). As illustrated, the suspension units 76 comprise suspension bolts 86 resiliently connected at either end to the brackets 84 and to cross frame members 82 by flexible mountings 88. The latter can be of any suitable construction, for example, flexible pads 90 of natural or synthetic rubber or like material. In general, the flexible supports 76 permit free movements of the shaker housing and associated shaking and hooking mechanisms during tree shaking operations.

Referring again to FIGURES 3 to 5, the illustrated hooking mechanism is of a type known as an adjustable C-clamp. This type mechanism employs a curved, pivotally mounted back pad or cushioning means 90 which, in the present instance, is pivotally mounted on the forward end of the shaker housing 80, as at 92. The clamp portion of the hooking mechanism comprises a mating pad or cushion means 94 pivotally mounted at 96 on a slidable frame 98. The frame 98 is slidably mounted on a side of the shaker housing 80 by means of a guideway 100 and follower 102. The guideway 100 is closed at the outer end 104 to limit outward movement of the follower and the clamp frame 98. The frame 98 is in turn guided during clamping movements by a bracket 106 (FIGURE 5). The guideway 100 and bracket 106 cooperate to insure a proper alignment of the clamping pad 94 with the back pad 90 during operation of the hooking mechanism to engage a tree.

As best shown in FIGURE 3, the clamp frame 98 is pivotally attached at its inner end to the follower 102 by means of a pivot connection 108. The frame 98 is additionally pivotally connected to the hydraulic cylinder 52 by means of a second pivot connection 110. This construction constrains the movements of the clamp frame 98 to a desired longitudinal movement with respect to the housing 80 and guideway 100 during most of the operation of the cylinder 52. However, at the extreme outstroke of the cylinder 52, the arrangement of the pivot connections 108 and 110 facilitates an opening operation of the clamp frame, as particularly illustrated in FIGURE 2. Thus, in the solid line positions of the pivots 108 and 110 shown in FIGURE 2, operation of the cylinder 52 will achieve a longitudinal movement of the frame 98 and clamp pad 94 along the arrow 112. However, further extension of the pivots to a fully extended position of the pivot connection 108 will cause the clamp frame 98 to be pivoted about the pivot 110 along the arrow 114 to an open position, as represented by the dashed line position of the clamp frame 98 and pad 94. Retraction of the operating cylinder 52 will cause a reverse operation, with the clamp frame and pad first moving to an aligned position along the path of the arrow 114 and then to a clamping position along the path of the arrow 112.

As noted previously, the associated hook and and shaking mechanisms 22 and 24 are suspended between the arms 64 of the alignment mechanism 26 for cooperative shaking movements. Thus, as shown in FIGURE 3, the shaking mechanism generally comprises a system of rotating eccentric weights mounted within the housing 80 and suspended by means of the cross supports 82 and resilient suspension units 76. The specific weight system shown in the illustrated apparatus comprises a pair of eccentric or offset weights 120 and 122 which are adapted to be rotated in opposite directions and in timed relation by means of a hydraulic motor 54 and a reversing drive chain 126 (FIGURES 3 and 4).

Referring to FIGURE 4, the weights 120 and 122 are illustrated as built up units nonrotatably secured to vertical stub shafts 128 and 130. The shafts 128 and 130 are supported for rotation within the housing 80 by means of top and bottom ball bearing units shown at 132 and 134. The respective shafts are provided with gears 134 and 136 suitably splined to the shafts and adapted to engage the drive chain 126. As best seen in FIGURE 3, the drive chain 126 engages the gears in such fashion as to drive the weight 122 in a clockwise direction, and through cooperation with an idler gear 138, to drive the weight 120 in a counterclockwise direction. Power to drive the chain and weight system in the described manner is obtained from the gear 140 which is attached directly, to the output shaft of the hydraulic motor 54 (see FIGURE 4).

The hydraulic motor 54 is operated by the valve 46 at the control box 28. Its speed of operation is separately controlled by the accelerator or foot pedal of the motor 14. It will be remembered that the hydraulic system derives its power from the pump 28 which is connected to the drive shaft of the motor 14. Accordingly, a rapid shaking operation is obtained by depressing the foot pedal whereas a slower shaking operation is obtained by releasing the foot pedal. In like fashion, the rates of elevating the boom 20, pivoting the alignment mechanism 26 and operating the hooking mechanism 22 are all dependent upon the rate of fluid flow through the pump 28, as controlled by the operator.

Figure 8:
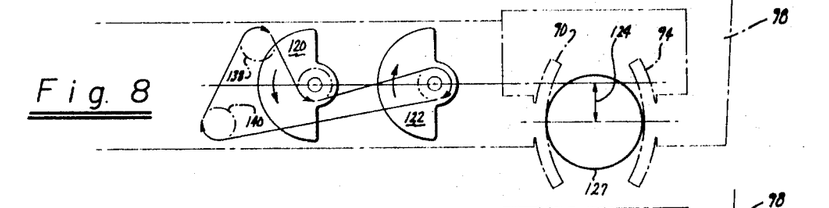

The operation of the shaking mechanism 24 to impart simultaneous reciprocatory and gyratory shaking forces to an engaged tree member is schematically illustrated in FIGURES 6 through 9. Thus, in the position illustrated in FIGURES 3, 4, and 6, the weights 120 and 122 have rotated an extreme forward position, at which point the weights are rotating past each other in opposite directions. In the position schematically illustrated in FIGURE 7, the weights have rotated rearwardly 90°, at which point they are exerting a rearward thrust generally along a line through the axes of the rotating weights. In the position of FIGURE 8, the weights have reached an extreme rearward position, with the weights again rotating past each other in opposite directions.

Figure 9:
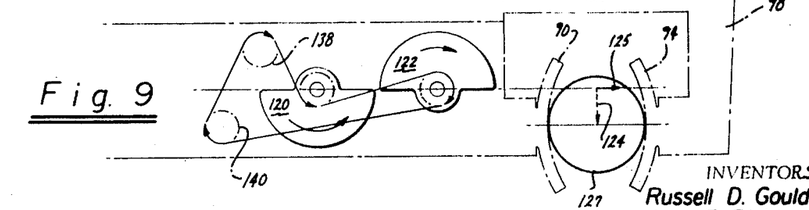

In FIGURE 9, the weights have rotated 90° in a forward direction, at which point they are exerting a forward thrust along a line through the axes of the weights. It will thus be observed that the counter rotating weights achieve a to-and-fro reciprocatory motion generally along the axis of the alignment mechanism 26, or more specifically, along a line through the axes of the rotating weights 120 and 122. It will be apparent that, in addition to the described reciprocatory vibration, the rotating weights achieve a rotary torque or gyration about their center of mass, with the maximum exertion of torque occurring at the forward and rearward positions of the rotating weights. Thus, in FIGURE 6, the rotating weights are exerting a torque on the system which tends to rotate the weight system in a clockwise direction about its center of mass. In general, the center of mass of the weight system will fall on a line between the weights, as schematically represented at 150. In FIGURE 8, a similar torque or moment arm is achieved in a rearward position of the weights, except in this instance, the opposite rotation of the weights tends to rotate the weight system in a counterclockwise direction about its center of mass 150. The system of counter rotating weights thus achieves a simultaneous oscillatory or gyratory vibration of the shaking mechanism about its center of mass, first in one direction and then in the other.

As illustrated in FIGURE 4, weights 120 and 122 are mounted for rotation in substantially the same plane. Preferably the opposed cushioning members 90 and 92 are also mounted in substantially the same plane as the counter rotating weights. This construction has the advantage of insuring that the above described vibratory effects of the shaking mechanism 24 are transmitted to an engaged tree member within a plane which is substantially perpendicular to the axis of a tree member. Such arrangement tends to eliminate vertical vibration or "buckling" of the shaking mechanism and consequent scuffing, gouging or like damage to the bark of an engaged tree member.

Figures 10A, 10B:
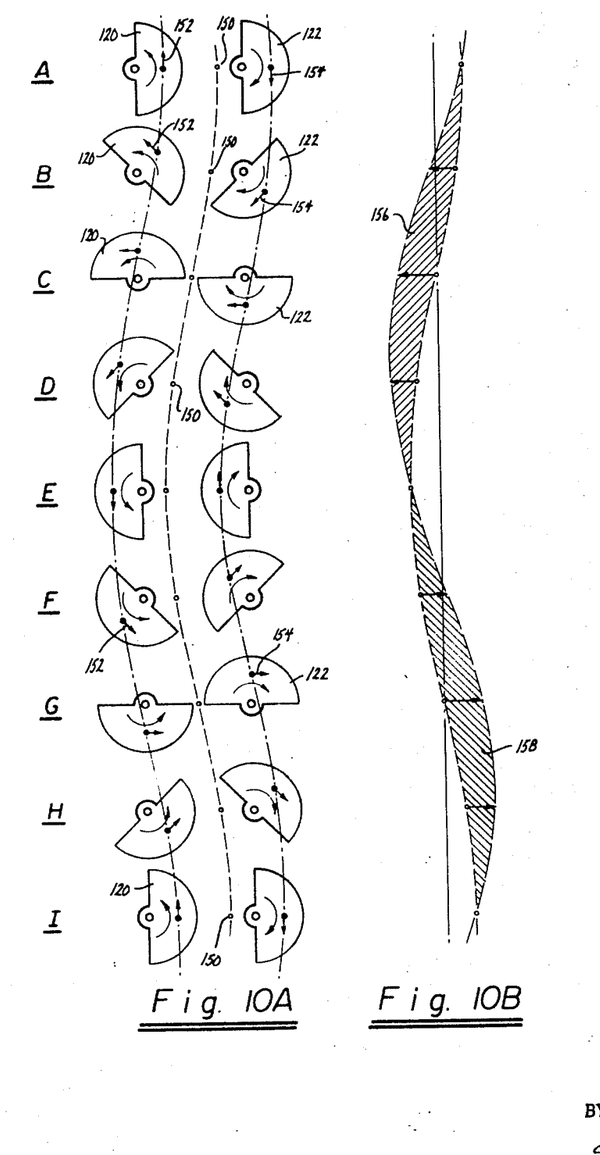
Figure 10C:
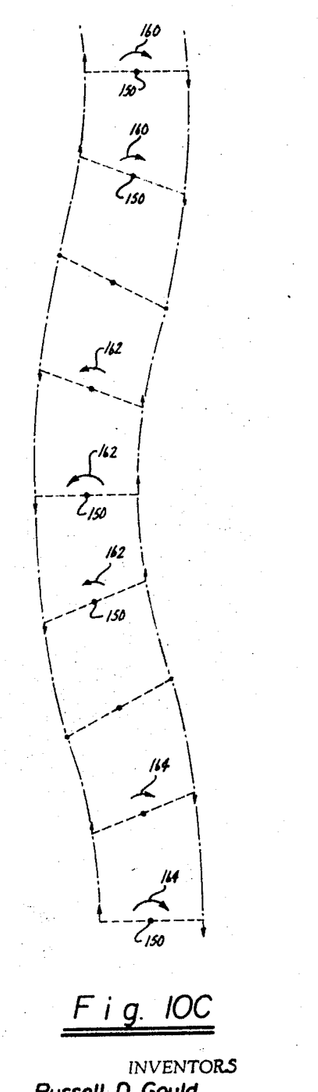

The simultaneous reciprocatory and gyratory shaking forces generated by the shaking mechanism 24 can be more easily understood by reference to a sequential representation of the shaking forces as diagrammatically presented in FIGURES 10A, B and C. Thus, in FIGURE 10A, successive rotational positions of the weights 120 and 122 are shown in sequence from top to bottom. It will be understood that the successive positions of the rotating weights occur in repetitive sequence by virtue of the timed rotation of the weights achieved by the hydraulic motor and drive chain assembly 54, 126.

In FIGURE 10A, the arrows 152 and 154 diagrammatically illustrate the unbalanced forces acting on the weights 120 and 122 about assumed centers of mass for the separate weights, as represented at 155.

FIGURE 10A also illustrates the manner in which the center of mass shifts back and forth along a ine between the rotating weights.

FIGURE 10B is derived from FIGURE 10A in that it represents the summation of the horizontal to-and-fro reciprocatory components of the lines of force 152 and 154. It will be understood that the effect of the rotating weights in achieving first a rearward thrust and then a forward thrust is necessarily additive. This reciprocatory movement or vibration is illustrated in FIGURE 10B by the shaded areas 156 and 158 which represent, respectively, the alternating rearward and forward reciprocatory thrusts of the weight system along a line through or generally parallel to a line through the axes of the rotating weights.

FIGURE 10C is similarly derived from 10A in that it represents the vertical or gyratory components of the lines of force 152 and 154. As shown in the top portion of FIGURE 10C, these vertical components achieved moment arms about the center of mass 150 tending to rotate the weight system in a clockwise direction, as represented by the arrows 160. In the central portion of FIGURE 10C, the direction of the moment arms is reversed, as represented by the arrows 162. In the lower portion of FIGURE 10C, the cycle is repeated with the moment arms tending to again achieve a clockwise rotation of the weight system (arrows 164). FIGURE 10C thus represents the oscillatory or gyratory vibration of the weight system about its center of mass 150. FIGURE 10C also illustrates that the gyratory vibration of the weight system occurs about a shifting center of mass, with the shift occurring along a line between the axes of the rotating weights.

From the foregoing diagrammatic analysis, it may be observed that the rotating weights tend to achieve a to-and-fro reciprocation along a line through or parallel to the axes of rotation of the weights 120 and 122 coupled with a simultaneous oscillation or gyration about the center of mass of the weight system. In a tree shaking apparatus of the type illustrated, the rotating weight system achieves a similar vibratory effect upon the suspended shaking and hooking mechanisms 22 and 24, although the ultimate shaking effect is necessarily altered somewhat due to a displacement of the center of mass of the assembled components of the mechanisms 22 and 24 with respect to the center of mass of the rotating weight system. However, the ultimate shaking effect as transmitted through the hooking mechanism 22 has been demonstrated to be closely related, if not substantially identical, to that of the rotating weight system itself.

Figures 6, 7:
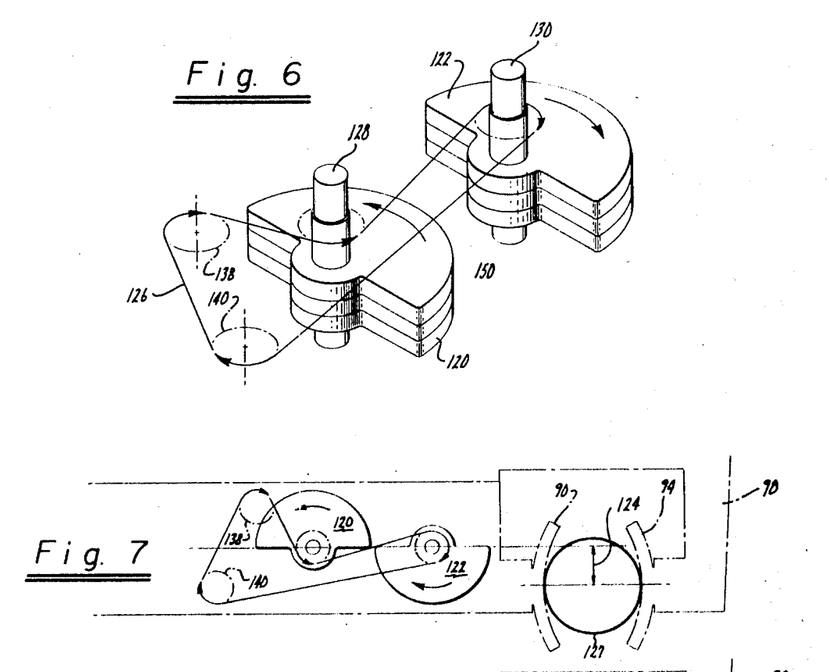
FIGURE 6 is a schematic view in perspective, illustrating one stage in the operation of a shaking mechanism useful in the machine of FIGURES 1 to 5.
FIGURES 7 to 9 are like views in plan, illustrating further stages in the operation of the shaking mechanism.

With reference to FIGURES 3, 7, and 9, it can be seen that a center line through the clamp pads 90 and 94 is substantially offset from a line through the shafts 128 and 130 of the counter rotating weight system. This lateral offset is represented in the drawings by the dimension 124. In view of the essentially reciprocatory nature of the shaking forces generated by the rotating weight system (see FIGURE 10B), this lateral offset of the hooking mechanism results in application to an engaged tree member of a supplemental torque or twisting moment as respects the axes of the tree. This supplemental force, diagrammatically represented in FIGURE 9 by the arrow 125, acts to impart a supplemental twisting or gyratory shaking force to the engaged tree member 127.

Having now described preferred embodiments of our improved tree shaking machine, the overall operation of the machine can be summarized as follows:

Assuming a position of the vehicle 10 adjacent a tree to be shaken, the operator may first manipulate the valve 44 to open the hooking mechanism 22. The control valves 40 and 42 for the boom 20 and alignment mechanism 26 can now be operated (either simultaneously or alternatively) to raise or lower the boom 20 and to pivot the alignment frame 26 as may be necessary to obtain a desired position of shaking alignment with respect to a tree member. As an illustration, a series of typical trunk shaking positions are shown in FIGURE 1. In the lowermost dotted and full line positions of the boom 20 and alignment mechanism 26, the hooking mechanism 22 is properly positioned to grasp and shake the trunks of trees 160 and 161. In the upper dotted position of the boom 20, the alignment mechanism 26 is shown in two separate positions, one aligned with respect to a tree trunk 162 disposed at an angle to the ground, and the other with respect to a tree limb 163. It will be understood that the boom 20 and alignment mechanism 26 are easily positioned in each of the various positions illustrated by actuation of the control valves 40 and 42 to actuate the operating cylinders 48 for the boom and 50 for the alignment mechanism.

Upon positioning the boom and alignment mechanism with respect to the desired tree member, the hooking mechanism 22 is closed and moved into a clamping position, in the manner previously described in conjunction with FIGURE 2. This operation causes the engaged tree member to be securely clamped between the pivoted cushioning members 90 and 94 of the hooking mechanism. The shaking operation is now initiated by opening the control valve 46 to admit hydraulic fluid to the shaking motor 54. The latter acts through the gear 140, reversing idler 138, and gears 134 and 136 to initiate the counter rotation of the eccentric weights 120 and 122. The rotation of the offset weights in an opposite timed relation to one another achieves a simultaneous to-and-fro and oscillatory vibration of both the hooking and shaking mechanisms 22 and 24 to achieve the desired simultaneous reciprocatory and gyratory shaking action. Since the counter rotating weights 120 and 122 are mounted in substantially the same plane as the clamp pads of the hooking mechanism, the described shaking motion is imparted to the engaged tree member in a plane which is substantially perpendicular to the axis of the tree member, thereby insuring a minimum of bark damage due to bucking or chattering at the point of contact. Shaking is enhanced during this operation by the offset relation of the pads 90 and 94 of the hooking mechanism 22 with respect to the reciprocatory thrust of the shaking mechanism 24. The combined shaking forces have been found to achieve a maximum amount of desired reciprocatory vibration coupled with a gyratory motion which tends to twist the tree member first in one direction and then in the other.

During the shaking operation the engaged tree member is reciprocated by the opposed inertia forces of the tree and the suspended hooking and shaking mechanisms. It will be understood that the suspended weight of the hooking and shaking mechanisms provides a sufficient moment of inertia to the unit to provide the desired shaking operation. This shaking operation is characterized by back and forth and alternately rotating, or gyrating, movement of the associated hooking and shaking mechanisms, with a consequent similar vibration and gyration of the engaged tree member. On the other hand, the suspended mounting of both the hooking and shaking mechanisms 22, 24 permits the shaking forces to be almost completely isolated from the propulsion unit or carrier 10. The described arrangement also permits a wide range and choice of carrier vehicles without any alteration in the desired shaking effect.

In a typical operation involving a tree shaking machine of the type illustrated, wherein the shaking mechanism employs rotating weights of approximately 70 pounds (combined weight 140 pounds) rotated at an angular speed of approximately 2,000 r.p.m., centrifugal forces in excess of 50,000 pounds, useful for shaking purposes, have been generated. Such forces have been demonstrated to generate shaking forces operable in the described reciprocatory and gyratory vibration patterns to remove approximately fifteen percent additional nut and fruit crops from orchards previously shaken with other previously known vibratory type shaking machines.

To those skilled in the art to which this invention relates, many changes in construction and widely different embodiments and applications of the invention will suggest themselves without departing from the spirit and scope of the invention. For example, instead of employing a chain drive to rotate the weights in opposite directions as illustrated, a reversing gear drive might easily be substituted. In fact, any drive mechanism capable of rotating the weights in opposite timed relation may be employed. It should be understood therefore that the disclosures and description contained herein are purely illustrative and not intended to be in any sense limiting.

We claim:

1. A tree shaking mechanism comprising a support frame, drive means for propelling said support frame over the ground, a boom having an articulated portion mounted for pivotal movement relative to said support frame, means to pivot said articulated portion of said boom so that the free end of said boom is elevatable with respect to the ground, a hooking mechanism carried by said free end of the boom and elevatable therewith, and gyratory shaking means carried by said boom and adapted to impart shaking forces to said hooking mechanism, said gyratory shaking means comprising a pair of oppositely rotating weights having their axes of rotation on a line substantially parallel to said portion of the boom, and means timing the rotation of said weights to achieve a reciprocatory vibration of said weights along said line and a gyratory oscillation about a center of gyration substantially midway between said rotating weights.

2. A tree shaking mechanism comprising: a support frame, drive means for propelling said support frame over the ground, a boom mounted for pivotal movement relative to said support frame, said boom having an articulated portion mounted for pivotal movement relative thereto, a hooking mechanism carried by said articulated portion of the boom, means mounted on said support frame to pivot said boom whereby its free end is elevatable with respect to the ground, means carried by said boom to pivot said articulated portion to align said hooking mechanism with a tree member to be shaken, and shaking means carried by said articulated portion of the boom to impart gyratory shaking forces to said hooking mechanism, said gyratory shaking means being freely suspended from said alignment means and including a pair of oppositely rotating weights having their axes on a line substantially parallel to said articulated portion of the boom, and means timing the rotation of said weights to achieve a reciprocatory vibration of the said rotating weights along said line through the axes of said rotating weights and a gyratory oscillation about a point on said line between the axes of said rotating weights.

3. In a tree shaking mechanism, an elongated boom, a hooking mechanism carried by said boom, said boom including an articulated portion to align said hooking mechanism with respect to a tree member to be shaken, gyratory shaking means adapted to shake said hooking mechanism, said gyratory shaking means including a pair of oppositely rotating weights mounted for rotation in substantially the same plane and having their axes of rotation on a line substantially parallel to said articulated boom portion, said gyratory shaking means also including means timing the rotation of said weights to achieve a principal reciprocatory motion along said line and a gyratory oscillation about a point on said line between the axes of said rotating weights.

4. A tree shaking mechanism as in claim 3 wherein said rotating weights are eccentric weights rotating in substantially the same plane as said hooking mechanism, to thereby effect shaking on a plane perpendicular to the engaged tree member.

5. A tree shaking mechanism as in claim 3 wherein said means timing the rotation of said weights is a chain drive with a reversing idler.

6. In a tree shaking mechanism, an elongated boom, a hooking mechanism carried by said boom, means to elevate said boom, means to align said hooking mechanism with respect to a tree member to be shaken, and gyratory shaking means adapted to shake said hooking mechanism, said gyratory shaking means including a pair of oppositely rotating weights along a line substantially parallel to said boom and means timing the rotation of said weights to achieve a reciprocatory vibration of said weights along a line substantially through the axes of the rotating weights and a gyratory oscillation about a point on a line between the axes of said rotating weights, said hooking mechanism being laterally displaced from said line through the axes of said rotating weights.

7. In a tree shaking mechanism, an elongated elevatable boom alignment means carried by said boom, a hooking mechanism carried by said alignment means, and gyratory shaking means also carried by said alignment means to impart gyratory shaking forces to said hooking mechanism, said gyratory shaking mechanism including a pair of eccentric weights mounted for rotation in substantially the same plane and means rotating said weights in opposite directions and in timed relation, whereby said rotating weights achieve a principal reciprocatory motion along a line through the axes of rotation of said rotating weights and a gyratory motion about a center of gyration substantially midway between said rotating weights, said gyratory shaking means being freely suspended from said alignment means in such fashion as to facilitate said reciprocatory and gyratory motions.

8. In a tree shaking mechanism, an elongated boom, a hooking mechanism carried by said boom, means to elevate said boom, means carried by said boom to align said hooking mechanisms with a tree member to be shaken, gyratory shaking means also carried by said boom to impart gyratory shaking forces to said hooking mechanism, said gyratory shaking mechanism comprising a pair of eccentric rotatable weights, said weights being mounted for rotation in substantially the same plane, means to rotate said weights in opposite directions and in timed relation to achieve a simultaneous reciprocatory motion along a line through the centers of rotation of said weights and a gyratory motion about a point on a line between said centers of rotation, said hooking mechanism being mounted on the boom to engage the tree member in substantially the same plane as the plane of rotation of said weights but laterally offset from said line through the centers of rotation of said weights, whereby said gyratory shaking mechanism imparts shaking forces to a tree member engaged by said hooking mechanism tending to oscillate the tree member first in one direction and then in the other.

References Cited
UNITED STATES PATENTS

| | | | |
|---|---|---|---|
| 3,084,967 | 4/1963 | Harrett | 56—328 X |
| 3,120,091 | 2/1964 | Gould et al. | 56—328 |
| 3,121,304 | 2/1964 | Herbst | 56—328 |
| 3,206,919 | 9/1965 | Read | 56—328 |
| 3,337,071 | 8/1967 | Clark | 56—328 X |
| 3,338,040 | 8/1967 | Shipley | 56—328 |

LUCIE H. LAUDENSLAGER, Primary Examiner